United States Patent
Kovesdy et al.

(10) Patent No.: US 11,785,527 B2
(45) Date of Patent: Oct. 10, 2023

(54) DYNAMIC CELLULAR SUBSCRIBER MANAGEMENT

(71) Applicant: Beamlink, Inc., Pasadena, CA (US)

(72) Inventors: Arpad Kovesdy, Germantown, TN (US); Mateo Abascal, Altadena, CA (US)

(73) Assignee: BEAMLINK, INC., Pasadena, CA (US)

(*) Notice: Subject to any disclaimer, the term of this patent is extended or adjusted under 35 U.S.C. 154(b) by 30 days.

(21) Appl. No.: 17/204,540

(22) Filed: Mar. 17, 2021

(65) Prior Publication Data

US 2021/0297926 A1    Sep. 23, 2021

Related U.S. Application Data

(60) Provisional application No. 62/990,907, filed on Mar. 17, 2020.

(51) Int. Cl.
| | |
|---|---|
| H04W 40/24 | (2009.01) |
| H04W 8/26 | (2009.01) |
| H04W 8/18 | (2009.01) |
| H04W 4/50 | (2018.01) |
| H04W 48/16 | (2009.01) |
| H04W 40/34 | (2009.01) |
| H04W 12/086 | (2021.01) |

(52) U.S. Cl.
CPC ......... *H04W 40/248* (2013.01); *H04W 4/50* (2018.02); *H04W 8/18* (2013.01); *H04W 8/26* (2013.01); *H04W 12/086* (2021.01); *H04W 40/246* (2013.01); *H04W 40/34* (2013.01); *H04W 48/16* (2013.01)

(58) Field of Classification Search
CPC ........ H04W 48/16; H04W 40/34; H04W 8/18
See application file for complete search history.

(56) References Cited

U.S. PATENT DOCUMENTS

| | | | |
|---|---|---|---|
| 6,101,382 A * | 8/2000 | Granberg | H04W 4/16 455/414.1 |
| 6,603,968 B2 | 8/2003 | Anvekar et al. | |
| 6,879,574 B2 | 4/2005 | Naghian et al. | |
| 7,289,805 B2 | 10/2007 | Tom et al. | |
| 7,567,519 B1 | 7/2009 | Daniel | |
| 7,673,048 B1 * | 3/2010 | O'Toole, Jr. | H04L 12/4633 709/227 |

(Continued)

OTHER PUBLICATIONS

P. Yang, X. Cao, X. Xi, Z. Xiao and D. Wu, "Three-Dimensional Drone-Cell Deployment for Congestion Mitigation in Cellular Networks," in IEEE Transactions on Vehicular Technology, vol. 67, No. 10, pp. 9367-9381, Oct. 2018.

*Primary Examiner* — Sulaiman Nooristany
(74) *Attorney, Agent, or Firm* — Patterson + Sheridan, LLP

(57) ABSTRACT

Techniques for cellular network subscriber management. A request for cellular service is received at a base station from a mobile device. The base station is communicatively coupled to a plurality of other base stations using a virtual private network (VPN) connection. It is determined, based on a first communication from the base station to a database using the VPN connection, that the mobile device does not have a recognized associated identifier, and in response an identifier for the mobile device is assigned. A second communication is routed from the base station to the mobile device using the identifier.

17 Claims, 14 Drawing Sheets

(56) References Cited

U.S. PATENT DOCUMENTS

| | | |
|---|---|---|
| 8,594,678 B2 | 11/2013 | Livneh |
| 10,298,544 B2 * | 5/2019 | Duval ................ H04L 12/4641 |
| 10,375,563 B1 * | 8/2019 | Bellam ................ H04L 63/104 |
| 2010/0093359 A1 | 4/2010 | Gallagher et al. |
| 2010/0246386 A1 | 9/2010 | Erceg et al. |
| 2016/0135204 A1 | 5/2016 | Mishra et al. |

* cited by examiner

DYNAMIC CELLULAR SUBSCRIBER MANAGEMENT

TECHNICAL FIELD

Embodiments presented in this disclosure generally relate to wireless communication. More specifically, embodiments disclosed herein relate to dynamic cellular subscriber management.

BACKGROUND

In situations where cellular communications have been disrupted, temporary cellular base stations can be utilized to reestablish connections. In some cases, cellular base stations are mounted on vehicles such as trucks or balloons. Other solutions use drone-mounted base stations to aid in areas where ground vehicles may have difficulty reaching the proper deployment point. In addition to providing temporary service, these solutions can also be used to facilitate more permanent last-mile cellular service, especially in areas where durable base stations may be expensive or difficult to install.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate typical embodiments and are therefore not to be considered limiting; other equally effective embodiments are contemplated.

To facilitate understanding, identical reference numerals have been used, where possible, to designate identical elements that are common to the figures. It is contemplated that elements disclosed in one embodiment may be beneficially used in other embodiments without specific recitation.

DESCRIPTION OF EXAMPLE EMBODIMENTS

Overview

Figure 1:
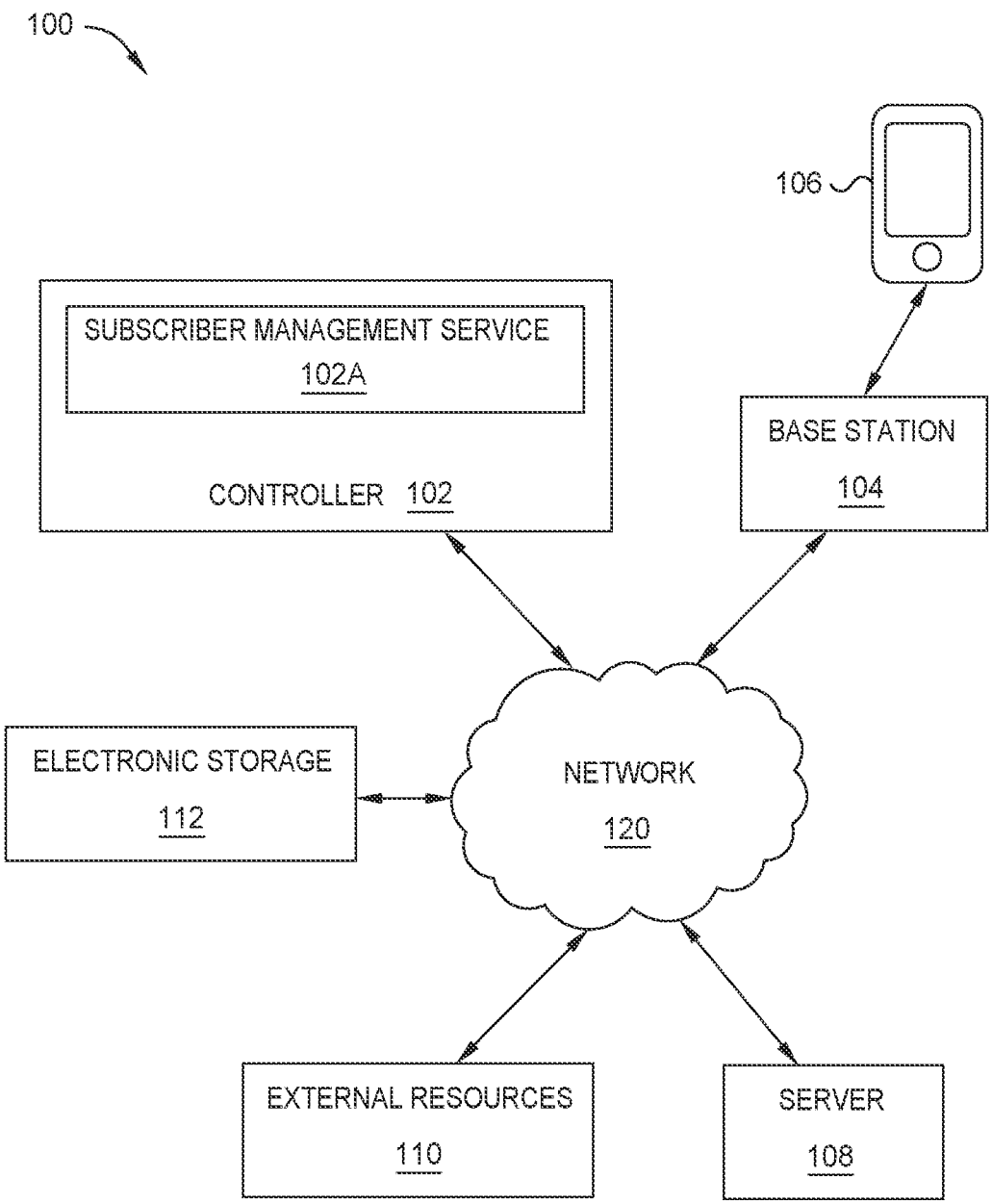
FIG. 1 is a block diagram illustrating a system for dynamic cellular subscriber management, according to one embodiment.

Embodiments include a method. The method includes receiving a request for cellular service at a base station from a mobile device. The base station is communicatively coupled to a plurality of other base stations using a virtual private network (VPN) connection. The method further includes determining, based on a first communication from the base station to a database using the VPN connection, that the mobile device does not have a recognized associated identifier and in response assigning an identifier for the mobile device. The method further includes routing a second communication from the base station to the mobile device using the identifier.

Embodiments further include a system. The system includes a first base station, a second base station, one or more processors, and a memory storing a program, which, when executed on the one or more processors, performs an operation. The operation includes establishing a first virtual private network (VPN) connection between the first base station and a VPN host. The operation further includes establishing a second VPN connection between the second base station and the VPN host. The operation further includes receiving a cellular communication at the first base station from a first mobile device, the cellular communication destined for a second mobile device. The operation further includes determining that the second mobile device is associated with the second base station using the VPN connection. The operation further includes routing the cellular communication to the second base station using the VPN connection.

Embodiments further include a non-transitory computer-readable storage medium having computer-readable program code embodied therewith, the computer-readable program code executable by one or more computer processors to perform an operation. The operation includes receiving a request for cellular service at a base station from a mobile device. The operation further includes determining, based on a first communication from the base station to a database using a virtual private network (VPN) connection, that the mobile device does not have a recognized associated mobile station international subscriber directory number (MSISDN), and in response assigning a first MSISDN for the mobile device, including assigning a partial identifier to the mobile device, automatically purchasing an MSISDN for the mobile device, and communicating the MSISDN to the mobile device. The operation further includes routing a second communication from the base station to the mobile device using the MSISDN.

EXAMPLE EMBODIMENTS

Permanent, durable, cellular infrastructure is typically manually configured for efficient operation. For example, base stations may be manually configured (e.g., by an administrator during deployment) to efficiently cover the surrounding area by reducing interference and coverage gaps. Further, mobile devices can be added to the network through a manual process involving configuring a subscriber identity module (SIM) card for the device and the relevant network (e.g., the relevant carrier), and providing the SIM card to the device.

Not all cellular users, however, have access to permanent, durable, cellular infrastructure. For example, a natural disaster could disrupt the existing physical infrastructure in a given area, making it impossible for users in that area to access their usual cellular carrier. As another example, many areas may lack permanent, durable, infrastructure entirely. This is especially true for areas where it may be inefficient, or expensive, to install durable cellular infrastructure. This can be referred to as the "last mile" connectivity problem, where the final leg of communications networks is not cost-effective to develop and maintain in many rural areas and developing nations.

One or more techniques discussed herein relate to dynamic subscriber management to address these challenges. In an embodiment, temporary (or permanent but less durable) cellular infrastructure (e.g., base stations) can be provided to areas lacking in service. These base stations can be configured to allow for dynamic subscriber management. For example, new phone numbers can be dynamically generated and assigned to mobile devices, without requiring typical SIM card configuration. Mobile devices associated with the dynamic subscriber management system can use these new phone numbers while existing service is unavailable. Calls, and other communications, can be routed to, and from, these mobile devices seamlessly.

Further, in an embodiment, components in the network (e.g., base stations) can communicate securely using virtual private network (VPN) services, and a mesh communication network. This can facilitate communication between components across multiple different networks, while maintaining secure connections and limiting the required infrastructure deployments. In an embodiment, base stations in the network can further be balanced (e.g., to avoid overloading a given base station and to decrease coverage gaps and overlaps). This can help ensure efficient connections between the base stations and the mobile devices. In an embodiment, the nearest neighbors of each base station can also be determined to assist the balancing algorithm and facilitate call handovers, where the mobile user moves from the coverage of one base station to another.

FIG. 1 is a block diagram illustrating a system 100 for dynamic cellular subscriber management, according to one embodiment. The system 100 includes a controller 102, a base station 104, a mobile device 106, a server 108, external resources 110, electronic storage 112, and a network 120. In an embodiment, the controller 102 provides information-processing capabilities for the system 100. As such, the controller 102 may include one or more of a digital processor, an analog processor, a digital circuit designed to process information, an analog circuit designed to process information, a state machine, or any other suitable mechanisms for electronically processing information. Although the controller 102 is shown in FIG. 1 as a single entity, this is for illustrative purposes only. In some embodiments, multiple controllers can be used and each controller can include multiple processing units.

In an embodiment, the controller 102 executes one or more computer program components. For example, the controller 102 can include a memory and can retrieve and execute programming instructions stored in the memory (e.g., software programs or algorithms) using the processors discussed above. These programming instructions can be described as various functional "applications" or "modules" within the memory of the controller 102, although alternate implementations may have different functions or combinations of functions. For example, the controller 102 includes a subscriber management service 102A that facilitates subscriber management, as discussed further below. Further, while the controller 102 is illustrated using software modules, the controller 102 can implement subscriber management techniques using software, hardware, firmware, or any combination thereof. The controller 102 may also include one or more electronic applications having graphical user interfaces configured to facilitate user interaction with the system 100.

Further, the subscriber management functionality described as implemented by the controller 102 (e.g., the subscriber management service 102A) can be implemented by processing units spread across multiple devices, including the controller 102, the base station 104, and the server 108. That is, these processing units may be physically located within the same device (e.g., a controller 102), or the controller 102 may represent processing functionality of multiple devices operating together (e.g., a processor included in a controller 102, a processor included a communication device/base station 104, a processor included in a mobile device 106, a processor included in a server 108, etc.).

The mobile device 106 can include one or more processors, a user interface, electronic storage, and any other suitable components. The processor may be configured to execute computer program components. The computer program components may be configured to enable an expert or user associated with a given computing platform mobile device 106 to interface with the network 120 and/or provide other functionality attributed herein to mobile device 106. By way of non-limiting example, mobile device 106 may include one or more of a desktop computer, a laptop computer, a handheld computer, a tablet computing platform, a smartphone, a gaming console, or any other suitable computing platform.

The electronic storage 112 may include electronic storage media that electronically stores information. The electronic storage media of electronic storage 112 may include one or both of system storage that is provided integrally (i.e., substantially non-removable) with the controller 102, communication device/base station 104, mobile device 106 (e.g., a smartphone), server 108, external resources 110, and removable storage that is removably connectable to the controller 102, communication device/base station 104, mobile device 106, server 108, or external resources 110 via, for example, a port (e.g., a USB port, a firewire port) or a drive (e.g., a disk drive). Electronic storage 112 may include one or more of optically readable storage media (e.g., optical disks), magnetically readable storage media (e.g., magnetic tape, magnetic hard drive, floppy drive), electrical charge-based storage media (e.g., EEPROM, RAM), solid-state storage media (e.g., flash drive), and other electronically readable storage media. Electronic storage 112 may further include one or more virtual storage resources (e.g., cloud storage, a VPN, and/or other virtual storage resources). Electronic storage 112 may store software algorithms, information determined by the controller 102, information received from external resources 110, information entered or selected via the mobile device 106, information generated or received by the communication device/base station 104, information generated by or received by the server 108, and any other suitable information that enables the system 100 to function as described herein.

External resources 110 include sources of information such as databases (e.g., relational or graph databases), websites, etc.; external entities participating with system 100 (e.g., systems or networks that store data associated with a user), one or more servers outside of system 100, a network (e.g., the internet) and/or portions thereof, electronic storage, equipment related to Wi-Fi™ technology, equipment related to Bluetooth® technology, equipment related to cellular communication technology, equipment related to VPN technology, data entry devices, or other resources. In some embodiments, some or all of the functionality attributed herein to external resources 110 may be provided by resources included in system 100.

In an embodiment, one or more of the controller 102, the base station 104, the server 108, the external resources 110, and the electronic storage 112 communicate using the communication network 120. The network 120 can be any suitable communication network, including a cellular network, a local area network (LAN), a wide area network (WAN), or the Internet. The components 102, 104, 108, 110, and 112 can communicate with the network 120 using any suitable wired and or wireless technology, including a cellular connection, a Wi-Fi connection (e.g., an 802.11 protocol), an Ethernet connection, or an optical network connection.

Figure 2:
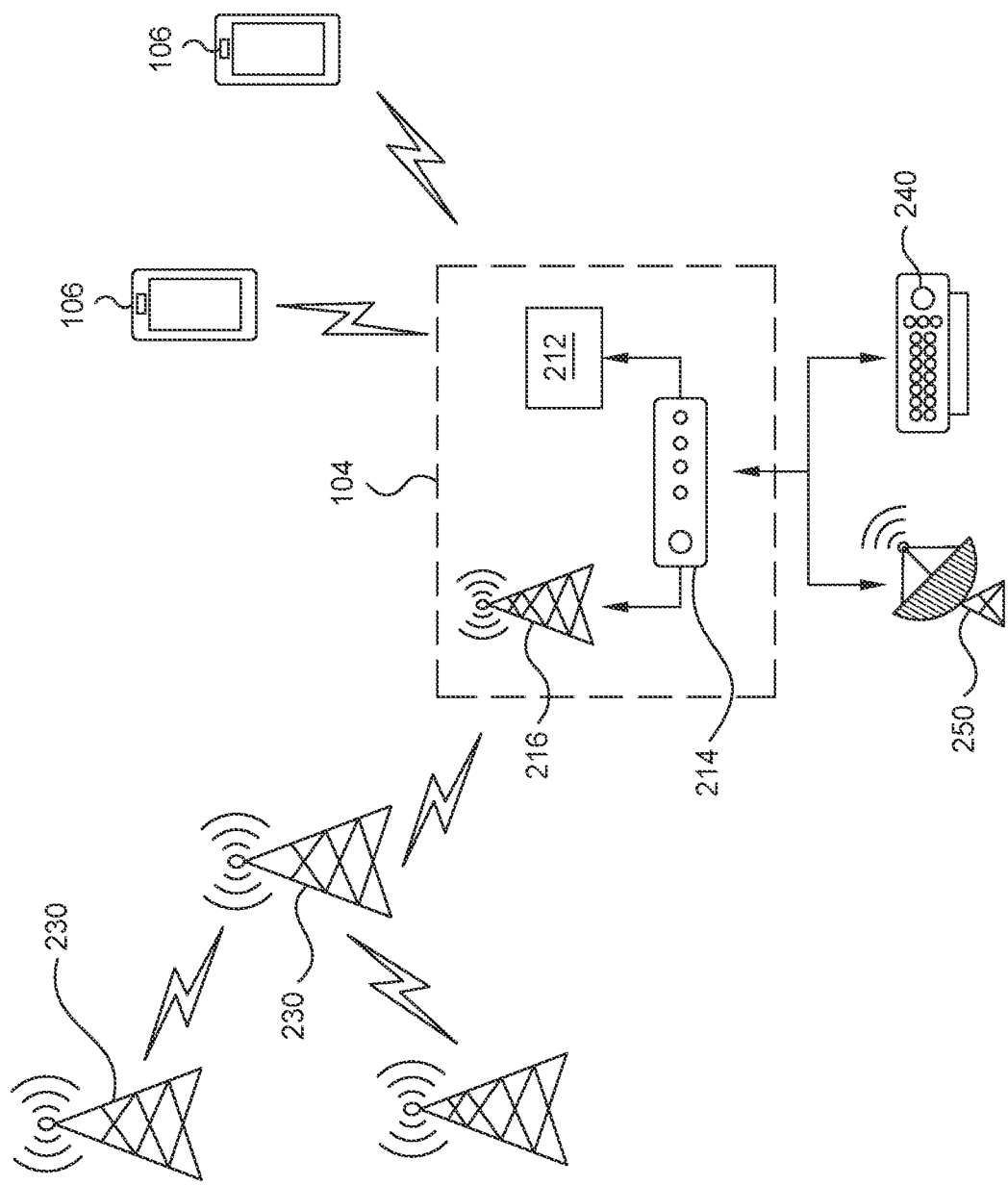
FIG. 2 illustrates a deployed base station linking cellular devices with communication infrastructure, according to one embodiment.

FIG. 2 illustrates a deployed base station linking cellular devices with communication infrastructure, according to one embodiment. A base station 104 is in communication with one (or more) mobile devices 106 via a transceiver 212. In turn, the base station 104 may include a router 214 enabling connectivity with an Ethernet backhaul 240 and/or a satellite backhaul 250. In an embodiment, a backhaul provides a network connection (e.g., an Internet connection) from a deployed network (e.g. of base stations) to the world (e.g., another network).

In an embodiment, the base station 104 further includes a mesh gateway 216 that can enable communication with one or more mesh repeaters 230. The mesh gateway 216 can allow data packets to enter and leave a mesh network from an outside network. In an embodiment, the mesh repeaters 230 are a component of a mesh network that serve as a node on the mesh network (sending and receiving data packets), or forward data packets to other nodes on the mesh network. In an embodiment, each mesh repeater 230 acts as a base station (e.g., the base station 104) and facilitates communication with mobile devices (e.g., mobile devices 106). Each mesh repeater 230 can include the capability to communicate with mobile devices 106 as part of the overall network, and therefore can also originate data to send to other devices (e.g., other mesh repeaters 230 or mobile devices 106) on the network, or to outside networks. Further, the mesh repeaters 230 can terminate data packets from other devices (e.g., other mesh repeaters 230 or mobile devices 106) or from outside networks.

Figure 3:
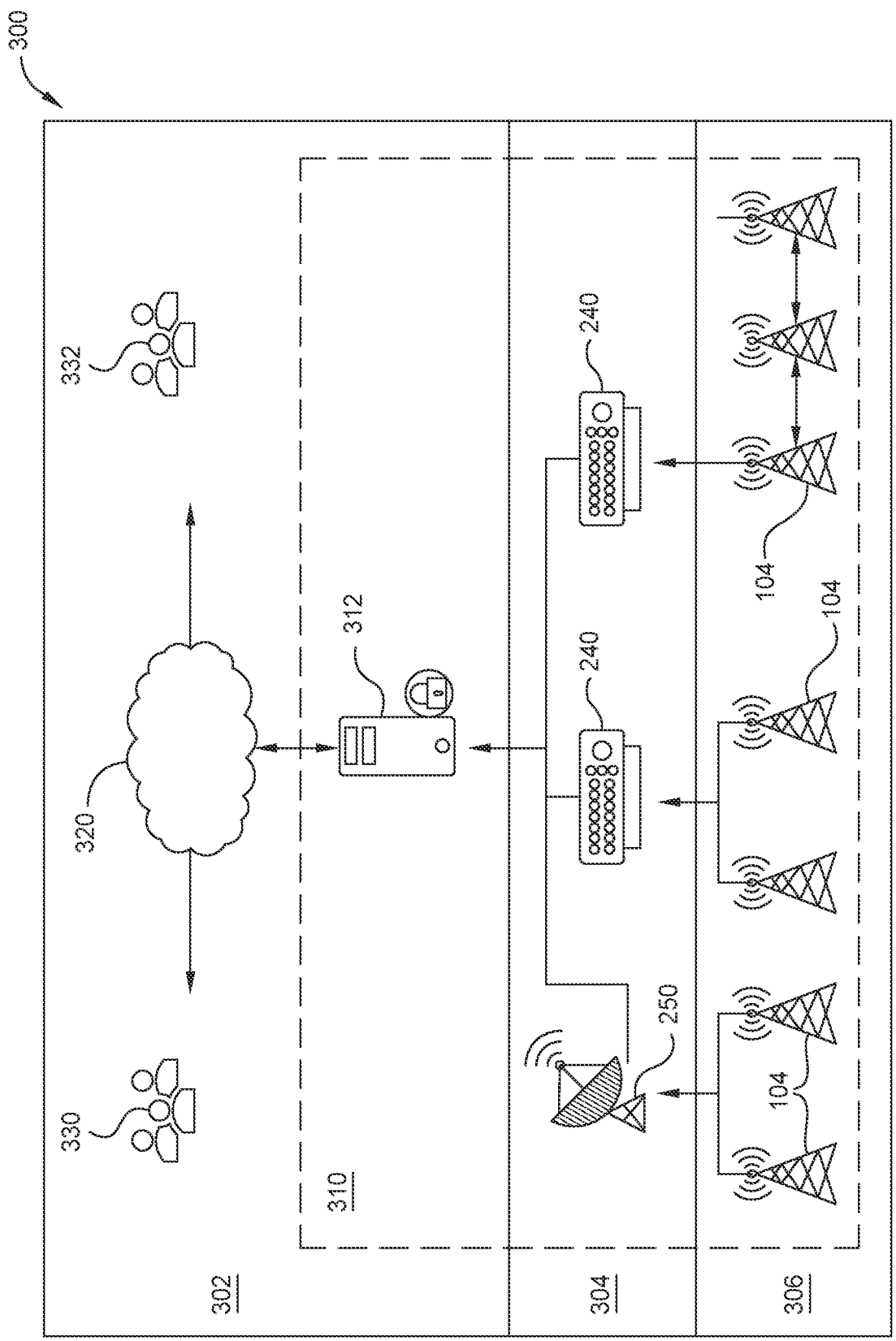
FIG. 3 illustrates a virtual private network encapsulating deployed base stations, according to one embodiment.

FIG. 3 illustrates a virtual private network encapsulating deployed base stations, according to one embodiment. In an embodiment, a communications network 300 is partitioned into three zones: a cloud environment 302, a backend 304, and a Radio Access Network (RAN) 306. The VPN 310 includes a VPN host 312 (e.g., included in the cloud environment 302), an Ethernet backhaul 240 and/or satellite backhaul 250, and any number of base stations 104. This is merely an example, and implementations can include multiple VPN hosts (e.g., servers) configured to share the network load. Through the VPN(s) 310, the VPN host 312 communicates with the cloud services 320 that may be utilized in managing network and hosting network databases. For example, the cloud services 320 can provide access to the VPN 312 for technical support staff 330 and network administrators 332 to configure and maintain the network remotely.

Figure 4:
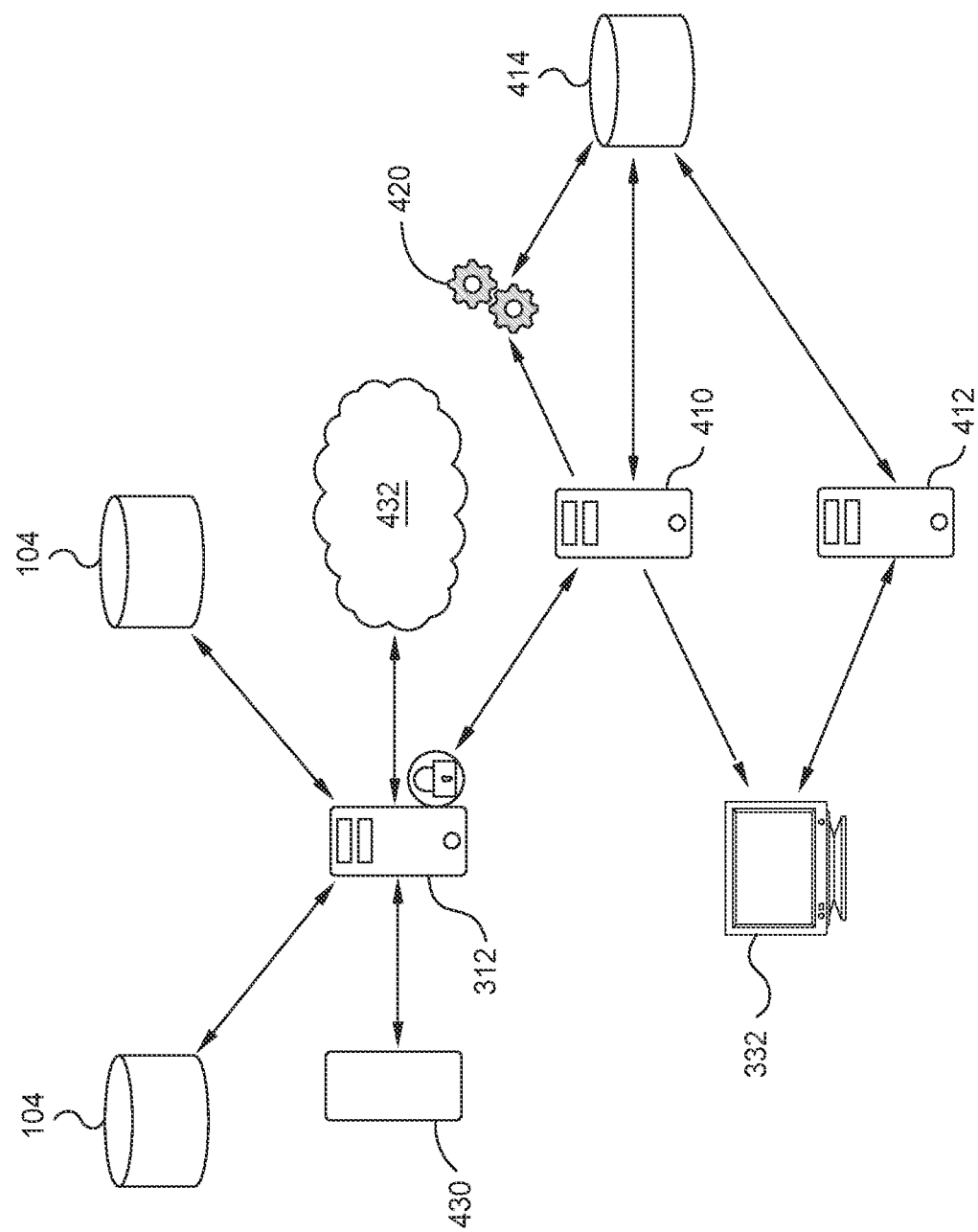
FIG. 4 illustrates cloud services available via a virtual private network, according to one embodiment.

FIG. 4 illustrates cloud services available via a virtual private network, according to one embodiment. In an embodiment, a VPN host 312 communicates with an application programming interface (API) web server 410, which can interface with network administrators and backend functions. For example, a network administrator 332 can utilize a web interface 412 to configure the network in real time and manage network settings. A database 414 may store and implement such network settings and user management. The database 414 may also be used for routing calls and short message service (SMS) messages, as described further below. In some implementations, a background worker 420 (e.g., a computing process or instance) can be utilized for tasks having higher computational overhead such as calculating the optimal range settings for base stations when the network is set to auto-configure. This is discussed further below with regard to FIG. 10. In an embodiment, the background worker 420 asynchronously accepts certain tasks from a main program that take a long time to compute and may therefore block the main program's execution. Accordingly, the background worker 420 can run in parallel with the main program, which can focus on updating the database and base station configurations. Meanwhile, the background worker 420 may compute improved changes to settings (e.g., optimal changes) and apply these changes once the calculations are complete.

In some embodiments, VPN host 312 can be in communication with the public switched telephone network (PSTN) 430, e.g., enabling calling to external Mobile Station International Subscriber Directory Numbers (MSISDNs) and purchasing of new MSISDNs for new phones. Also, other embodiments can include connectivity with a messaging and telephone number API 432.

Figure 5:
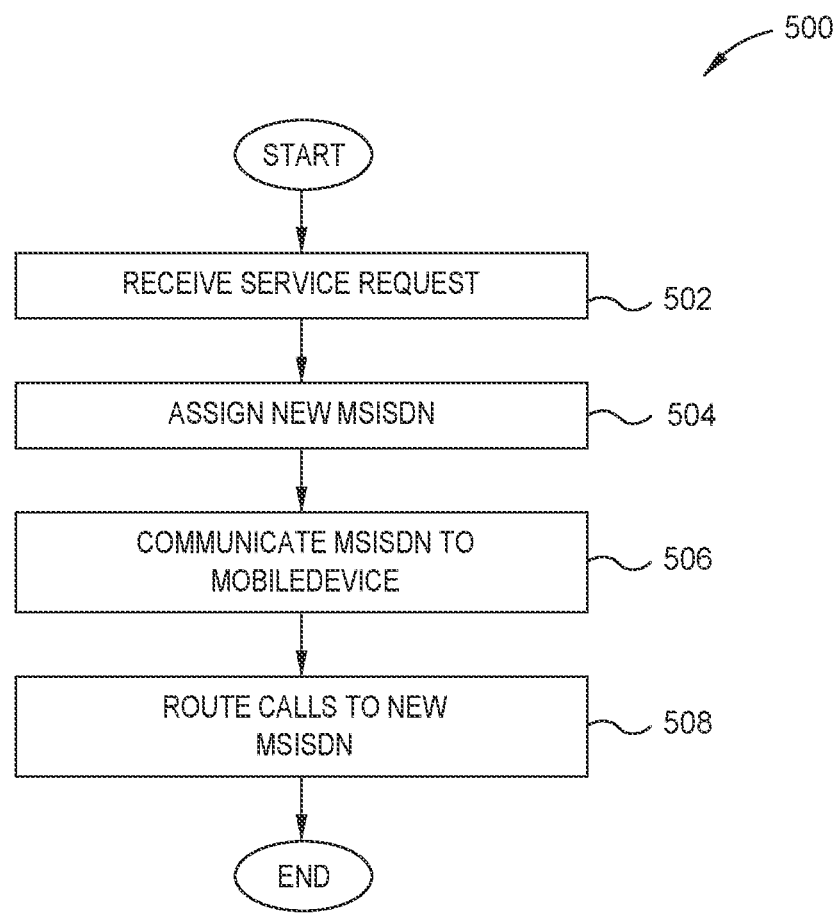
FIG. 5 illustrates an exemplary cellular subscriber management method for providing calling numbers to mobile devices, according to one embodiment.

FIG. 5 is a flowchart 500 for cellular subscriber management, in accordance with one or more embodiments. At block 502, a subscriber management service (e.g., the subscriber management service 102A illustrated in FIG. 1 or any other suitable service or combination of services) receives a request for cellular service from a mobile device (e.g., a phone). In some embodiments, the request for cellular service includes a location for the user associated with the mobile device. This can allow emergency responders to locate the user in an emergency (e.g., using a new MSISDN assigned to the mobile device). In an embodiment, the location includes a physical address provided manually by a user. Alternatively, or in addition, a user's location is automatically determined and provided to the subscriber management service (e.g., by a base station, a server, or another suitable component in the system 100 described in FIG. 1). In some embodiments where the user's location may be automatically determined by the system, the location can be calculated based on the strength of a signal received at one or more base station(s) from the user's mobile device. In some implementations, when there is more than one available network for the user's mobile device to connect to, the request for cellular service can require the user to select which network to connect to.

At block 504, the subscriber management service assigns a new MSISDN to the mobile device. In an embodiment, the subscriber management service assigns the new MSISDN independently of any prior MSISDN assigned to the mobile device, any service provider previously associated with the phone, any prior subscription for cellular service associated with the mobile device, and any SIM data associated with the mobile device. For example, as part of assigning the new MSISDN the subscriber management service can purchasing the new MSISDN from a database of available MSISDNs (e.g., international MSISDNs). An MSISDN is merely one example of a network identifier that can be assigned by the subscriber management service, and any suitable identifier can be used.

Further, this is merely an example. In an embodiment, MSISDNs (or other identifiers) could be provided using SIM cards or other techniques. This can facilitate, for example, last mile coverage where base stations are provided on a longer term basis for a more consistent set of users. Automatic assigning of an MSISDN could facilitate more temporary coverage (e.g., in case of a natural disaster).

At block 506, the subscriber management service communicates the new MSISDN to the mobile device. In some embodiments, the subscriber management service communicates the MSISDN to the mobile device using a VPN. This is discussed further below with regard to FIG. 7.

At operation 508, the subscriber management service routes calls to the new MSISDN. In an embodiment, the routing includes directing incoming calls to the new MSISDN, and redirecting incoming calls to a prior MSISDN associated with the mobile device to the new MSISDN. For example, when roaming is enabled in a mobile device and the primary carrier has no service, the mobile device can automatically connect to a roaming provider (e.g., the subscriber management system illustrated in FIG. 1) and try to register to use its services. As such, base stations can allow open registration, or connections from any foreign mobile device on the network. This is discussed further below with regard to FIG. 6.

In an embodiment, when a user's primary carrier (e.g., a prior carrier associated with the mobile device) comes back online or the mobile device enters a zone where their primary carrier has signal, a mobile device can automatically connect to their primary carrier instead of the subscriber management service. For example, the mobile device can have roaming enabled, and can attempt to connect to the primary carrier before connecting to the subscriber management service. In such circumstances, if the primary network is available the mobile device can revert to its previous settings, including utilizing its prior MSISDN. In this embodiment, the subscriber management service acts as a roaming provider which the mobile device can connect to when another network is unavailable. As discussed above, in the case of an emergency where the primary carrier is unavailable, the mobile device can be automatically connected to an available base station using the subscriber management service. Further, where a mobile device does not have access to a primary provider (e.g., as part of a last-mile solution) the mobile device can be automatically connected to an available base station using the subscriber management service.

In an embodiment, the subscriber management service redirects incoming calls to the mobile device using call forwarding based on aliased MSISDNs stored in a database (e.g., database 414 illustrated in FIG. 4). For example, the aliased MSISDNs may include a number of newly assigned MSISDNs, which may be selected by a user from a listing of available MSISDNs.

Further, in an embodiment, the subscriber management service uses an Internet protocol to implement voice calling, SMS, and cell network connection as part of performing blocks 502-508. In an embodiment, the request for cellular service is received at a base station, and communicated via an API to a third-party communications provider to facilitate purchasing the new MSISDN, assigning the new MSISDN, communicating the new MSISDN to the mobile device, routing incoming calls to the mobile device using the new MSISDN, and routing outgoing calls to the PSTN. Routing outgoing calls can also include implementing, for example, SIP trunking.

In an embodiment, a base station (e.g., the base station 104 illustrated in FIG. 1) may be associated with a mesh network. A mesh network can be configured to allow nodes (e.g., computers or base stations) to connect to each other dynamically and transfer information to other nodes on the mesh network without a dependency for hierarchy or predetermined organization. In some embodiments, the base station may include a software-defined radio configured to switch between different communication protocols and/or frequencies. The different communication protocols may include one or more of LTE, Wi-Fi, GSM, GPRS, or any other suitable protocols.

In an embodiment, the subscriber management service uses a frequency allotted by a regulator (e.g., the FCC), which is set manually in the software, for cellular communication. Alternatively, or in addition, the subscriber management service uses automatic frequency switching in response to detected interference. For example, interference can come from use of the frequency by other radio operators or spurious emissions. This interference often changes over time and/or depends on location and can be difficult to predict. Accordingly, in an embodiment the subscriber management service can perform a frequency scan and automatically select the frequency with the lowest interference (e.g., for communication between a base station and a mobile device).

Figure 6:
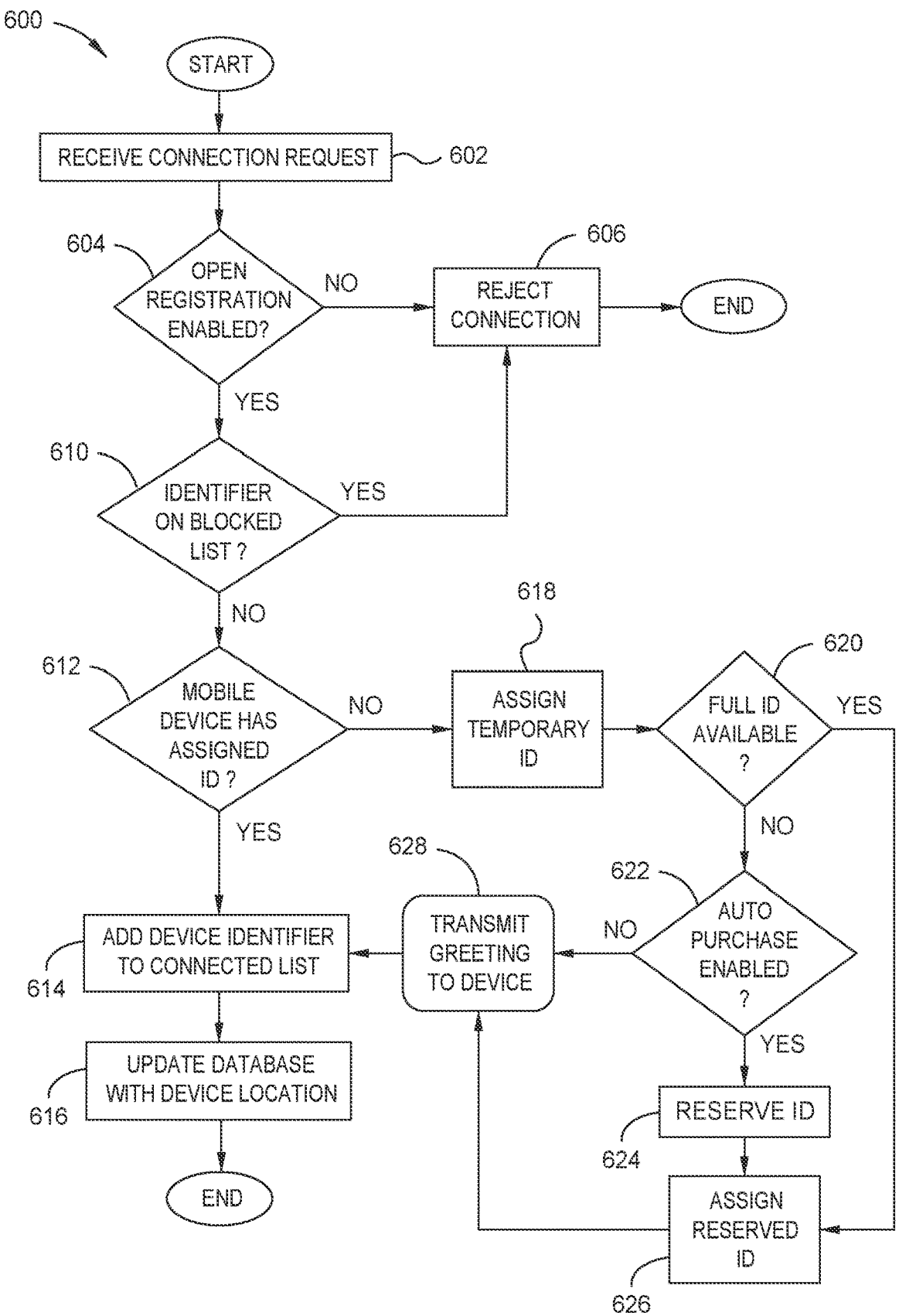
FIG. 6 is a flowchart for connecting a mobile device to a base station, according to one embodiment.

FIG. 6 is a flowchart 600 for connecting a mobile device (e.g., 106 illustrated in FIG. 1) to a base station (e.g., 104 illustrated in FIG. 1), according to one embodiment. In an embodiment, this is referred to as open registration of a mobile device.

At block 602, a subscriber management service (e.g., the subscriber management service 102A illustrated in FIG. 1 or any other suitable service or combination of services) receives a connection request from a mobile device. In an embodiment, the request is received at a base station associated with the mobile device. As discussed above, the subscriber management service can operate at the base station, at any other suitable network device (e.g., a controller), or at a combination of the base station and other devices. The connection request can use any suitable communication protocol (e.g., a suitable cellular protocol).

A block 604, the subscriber management service determines whether open registration is enabled. In an embodiment, the subscriber management service further (or alternatively) determines whether the base station is allowing new connections. If either is false the flow proceeds to block 606 and the connection is rejected. In an embodiment, at block 606 the subscriber management service transmits an indication of the rejection (e.g., a network message) to the mobile device.

At block 610, the subscriber management service determines whether an identifier (e.g., the mobile device's International Mobile Equipment Identity (IMEI)) is on a blocked list. In an embodiment, the subscriber management service maintains a blocked list of devices which are blocked from connection using the subscriber management service. If the identifier is on the blocked list, the flow proceeds to block 606 and the subscriber management service rejects the connection. If not, the flow proceeds to block 612.

At block 612, the subscriber management service determines whether the mobile device has already been assigned a full MSISDN (or another suitable identifier). If so, the flow proceeds to block 614. In an embodiment, maintaining a list of previously assigned numbers allows a mobile device to maintain a persistent MSISDN across sessions. For example, a user may move between base stations associated with the subscriber management service. Maintaining a list of previously assigned numbers allows the subscriber management service to operate using the same MSISDN for the same mobile device. This is merely an example. Alternatively, the subscriber management service assigns a new identifier (e.g., a new MSISDN) for every session (e.g., the flow always proceeds to block 618).

At block 614, the subscriber management service adds an identifier associated with the mobile device (e.g., the IMEI) to a connected list (e.g., a list of connected mobile devices for the subscriber management service). This list can be called the home location registry (HLR). In an embodiment, the HLR is maintained in a central location (e.g., the database 414 illustrated in FIG. 4) and includes an identifier (e.g., an MSISDN) and location for each mobile device connected to the subscriber management network. Further, in an embodiment, the subscriber management service enables voice calling, SMS, web services, and any other suitable services for the mobile device. At block 616, the subscriber management service updates the HLR (or any other suitable repository) with the location of the mobile device.

Returning to block 612, if the subscriber management service determines that an identifier (e.g., an MSISDN) was not previously assigned to the mobile device, the flow proceeds to block 618. At block 618, the subscriber management service assigns a temporary identifier. In an embodiment, the temporary identifier is a temporary local phone number (e.g., a partial MSISDN).

At block 620, the subscriber management service determines whether a complete identifier (e.g., a complete MSISDN) is available. For example, the subscriber management service can query a database (e.g., the database 414 illustrated in FIG. 4) for available identifiers that have been purchased and are not yet assigned to an IMEI. If no complete identifier is available, the flow proceeds to block 622.

At block 622, the subscriber management service determines whether automatic purchasing of a complete identifier (e.g., a complete MSISDN) is enabled. If so, the flow proceeds to block 624.

At block 624, the subscriber management service reserves a new identifier (e.g., a new MSISDN). For example, the subscriber management service can interact with an available telephone and messaging API (e.g., the API 432 illustrated in FIG. 4), and use the API to retrieve a list purchasable MSISDNs, select one, and send a request to purchase the number through the API.

At block 626, the subscriber management service assigns the reserved identifier (e.g., the reserved identifier) to the IMEI for the mobile device. At block 628, the subscriber management service transmits a greeting to the mobile device (e.g., an SMS message). In an embodiment, the greeting includes the new identifier (e.g., the new MSISDN). This can be a temporary identifier (e.g., assigned at block 618) or a full identifier (e.g., reserved at block 624). For example, if a full identifier is not assigned to the mobile device, the mobile device may be able to communicate within an internal network but not make calls, receive calls, send SMS, or receive SMS to and from the PSTN.

Figure 7:
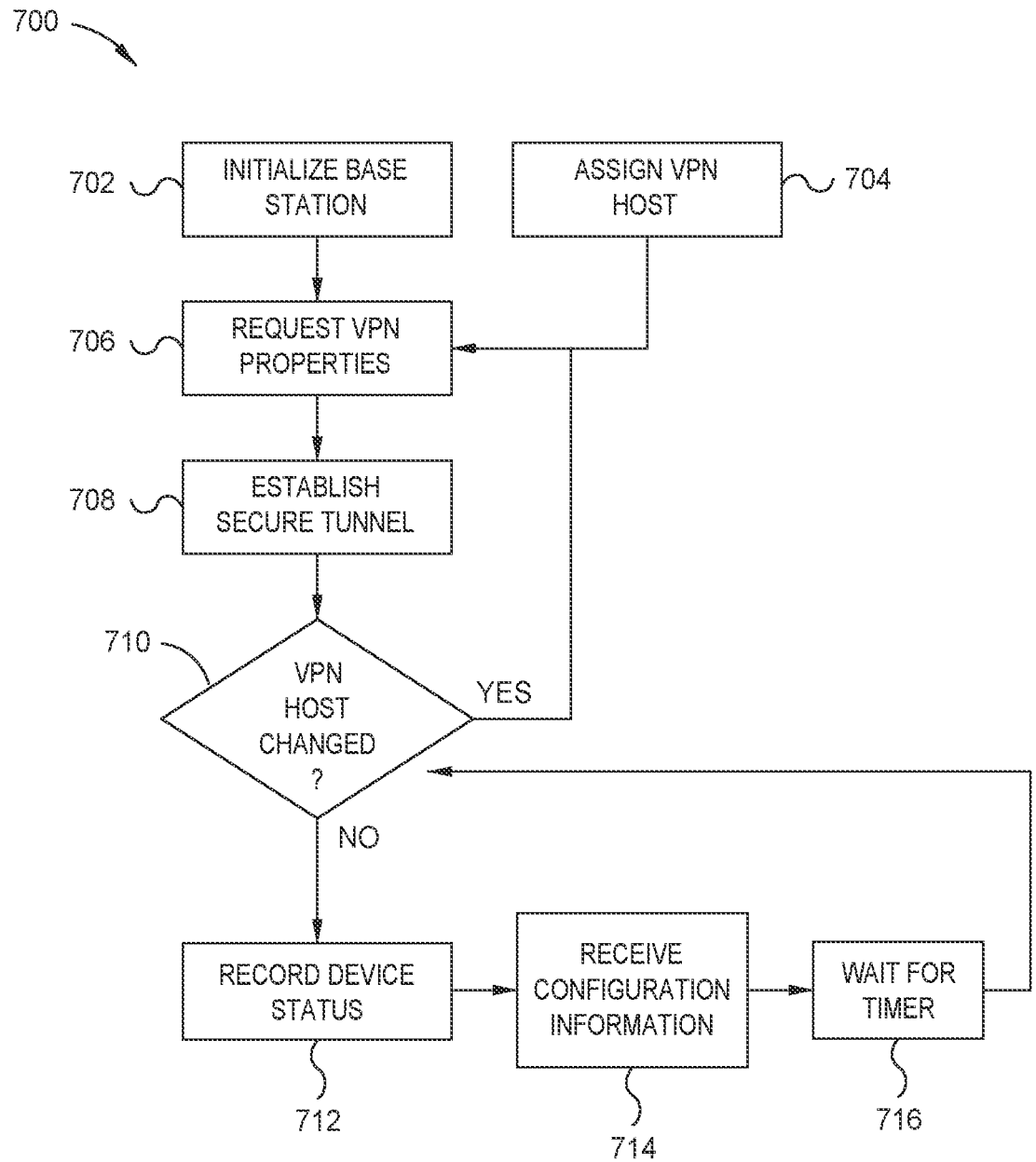
FIG. 7 is a flowchart for connecting a base station to a network, according to one embodiment.

FIG. 7 is a flowchart 700 for connecting a base station (e.g., a base station 104 shown in FIG. 1) to a network (e.g., network 120), according to one embodiment. At block 702, a subscriber management service (e.g., the subscriber management service 102A illustrated in FIG. 1 or any other suitable service or combination of services) initializes a base station (e.g., initializes software associated with a base station). As discussed above, the subscriber management service can operate at the base station, at any other suitable network device (e.g., a controller), or at a combination of the base station and other devices.

At block 704, the subscriber management service assigns a VPN host for a VPN. In an embodiment, base stations implementing the subscriber management techniques discussed above (e.g., in relation to FIGS. 5-6) and below can communicate with each other, and with central controllers (e.g., the controller 102 illustrated in FIG. 1), using a VPN. For example, multiple base stations can be associated with multiple different networks, and can communicate with each other and with a central controller using a VPN (e.g., the base stations 104 illustrated in FIG. 3 communicate using the VPN host 312). This can provide secure, protected, communication. In an embodiment, at block 704 the subscriber management service can assign more than one VPN host for the VPN.

At block 706, the subscriber management service requests VPN properties. For example, the subscriber management service (e.g., operating on a base station) can request a VPN host address (e.g., an IP address), port, and access credentials (e.g., a username and password).

At block 708, the subscriber management service establishes a secure tunnel. For example, the subscriber management service can use the VPN properties requested at block 706, above, to establish a secure tunnel between a base station and a VPN host. The subscriber management service can use any suitable VPN technique (e.g., OpenVPN®).

At block 710, the subscriber management service determines whether a VPN host assignment has changed (e.g., relative to a prior connection). For example, the subscriber management service (e.g., operating on a base station) can continue to operate using the VPN host identified at block 706. During operation of a base station, however, the VPN host associated with the base station may change. If it does, the base station can transition to using the new VPN host (e.g., establishing a secure tunnel to the new VPN host) in place of the host with properties maintained in storage. If the VPN host has changed, the flow returns to block 706 and the subscriber management service establishes a secure tunnel between the base station and the new VPN host.

If the VPN host has not changed, the flow proceeds to block 712. At block 712, the subscriber management service records the mobile device status. For example, the subscriber management service can upload the mobile device status to a central database (e.g., the database 414 illustrated in FIG. 4) for future use.

At block 714, the subscriber management service receives configuration information. For example, the subscriber management service can receive base station configuration information (e.g., power settings, radio settings, etc.) from a central database (e.g., the database 414 illustrated in FIG. 4). In an embodiment, the subscriber management service can facilitate communication between the base station and the central database using the VPN host. The subscriber management service can further receive configuration information for subscriber management (e.g., an updated blocked list as discussed above in relation to FIG. 6).

At block 716, the subscriber management service waits for a timer. For example, the subscriber management service can wait a specified period of time between checks for a new VPN host and check for updates of configuration information. When the timer expires, the flow returns to block 710 and the subscriber management service determines whether the VPN host has changed.

Figure 8:
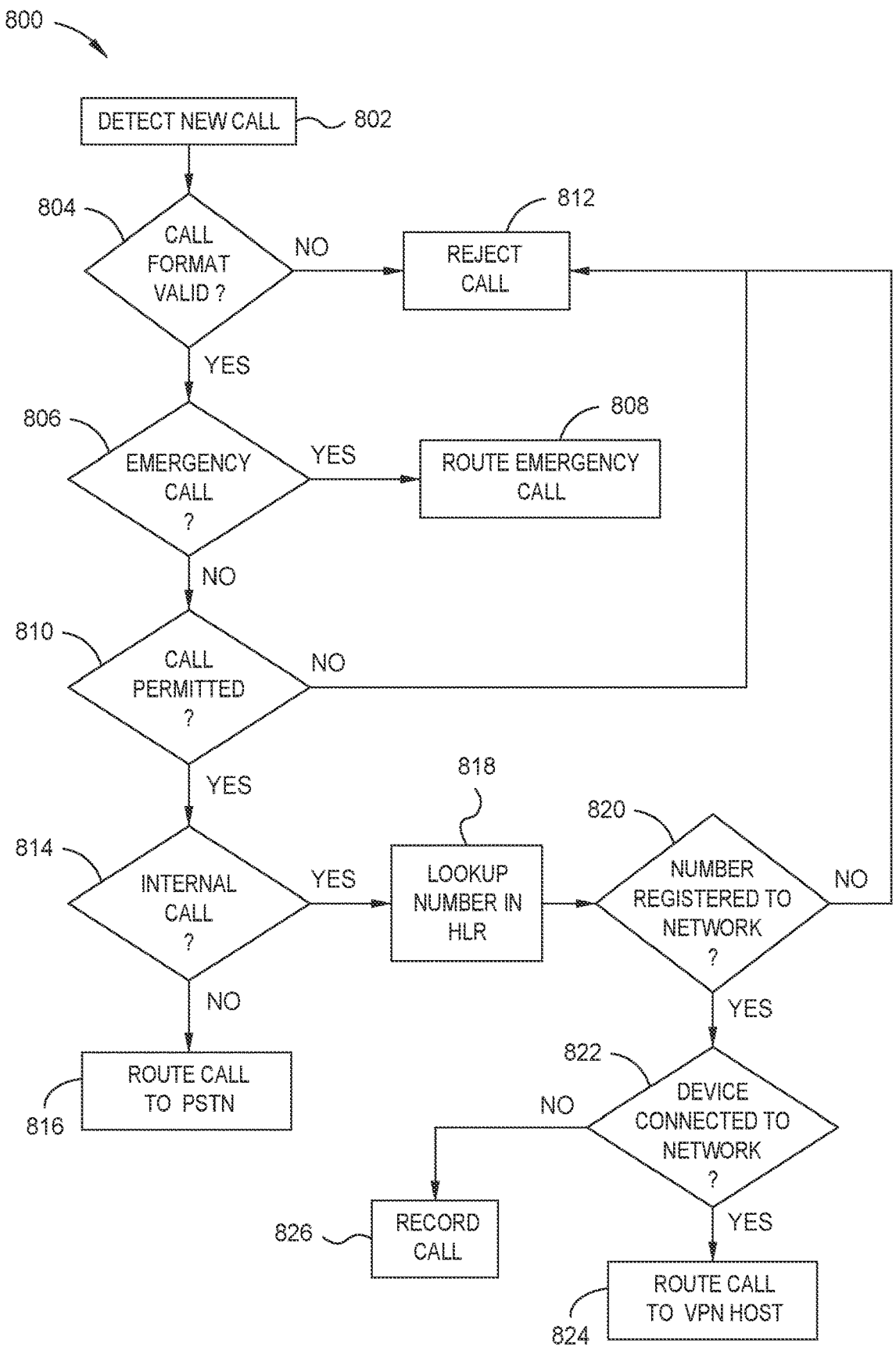
FIG. 8 is a flowchart for processing an outgoing call by a mobile device to a base station, according to one embodiment.

FIG. 8 is a flowchart 800 for processing an outgoing call by a mobile device (e.g., a mobile device 106 shown in FIG. 1) to a base station (e.g., a base station 104 shown in FIG. 1), according to one embodiment. At block 802, a base station (e.g., the base station 104 illustrated in FIG. 1, operating the subscriber management service 102A or any other suitable service or combination of services) detects that a new call is initiated by a mobile device (e.g., a phone).

At block 804, the base station determines whether the call format is valid. For example, the base station can determine whether the format of the call number is valid. If not, the flow proceeds to block 812 and the base station rejects the call. If so, the flow proceeds to block 806.

At block 806, the base station determines whether the call is an emergency call. For example, the base station can compare the destination MSISDN associated with the call with a list of stored known emergency numbers. If the call is an emergency call, the flow proceeds to block 808. At block 808, the base station routes the emergency call. For example, the base station routes the call to an emergency service in an external communication network.

If the call is not an emergency call, the flow proceeds to block 810. At block 810 the base station determines whether the call is permitted. For example, the base station can determine whether an identifier associated with the mobile device making the call (e.g., an IMEI) is registered and permitted to make the call. If not, the flow proceeds to block 812 and the call is rejected. If so, the flow proceeds to block 814.

At block 814 the base station determines whether the call is internal. For example, the base station can determine whether the call originates or terminates in the PSTN. If so, the call is not an internal call. In an embodiment, the base station can determine whether the call is internal based on determining whether the destination MSISDN is a local number or a full MSISDN (e.g., a telephone number that matches country code, area code, and other syntax requirements). The base station can classify numbers that do not fit these requirements as local numbers, and internal calls. If the call is not internal, the flow proceeds to block 816.

At block 816 the base station routes the call to the PSTN. In an embodiment, since the call is not internal, at block 816 the base station routes the call to the PSTN via an external calling API (e.g., the API 432 illustrated in FIG. 4). For example, if the destination MSISDN for the call falls into an E.164 standard with an international calling code (optional), area code, and local phone number, then the call can be routed to a VoIP provider (e.g., the API 432 illustrated in FIG. 4). Otherwise, if it is just the local phone number then it can be assumed to be a local number.

Returning to block 814, if the call is internal the flow proceeds to block 818. At block 818 the base station looks up the call number in the HLR (e.g., stored in a database 414 illustrated in FIG. 4). At block 820, the base station determines whether the destination MSISDN is currently registered to a device in the system. If not, the flow proceeds to block 812 and the base station rejects the call.

If so, the flow proceeds to block 822. At block 822, the base station determines whether the destination device is currently connected to the subscriber management network. For example, the base station can determine whether the destination device is included in a connected list, discussed above in relation to block 614 in FIG. 6. In an embodiment, the connected list can be maintained at a central database (e.g., the database 414 illustrated in FIG. 4). Further, in an embodiment, the base station can access the connected list using a VPN (e.g., using the VPN host 312 illustrated in block 3. If so, the flow proceeds to block 824. At block 824 the base station routes the call to the VPN host. In an embodiment, the call is then forwarded to another base station (e.g., a destination base station associated with the destination mobile device) by the VPN host.

Returning to block 822, if the destination device is not currently connected to the subscriber management network, the flow proceeds to block 826. At block 826 the base station records the call. For example, base station can activate an automated voice messaging system to record the call.

In an embodiment, the flowchart 800 is discussed in terms of voice calls. This is merely one example. Similar techniques can be applied to SMS messages (e.g., replacing recording the call at block 826 with recording the SMS message) or any other suitable communication between devices.

Figure 9:
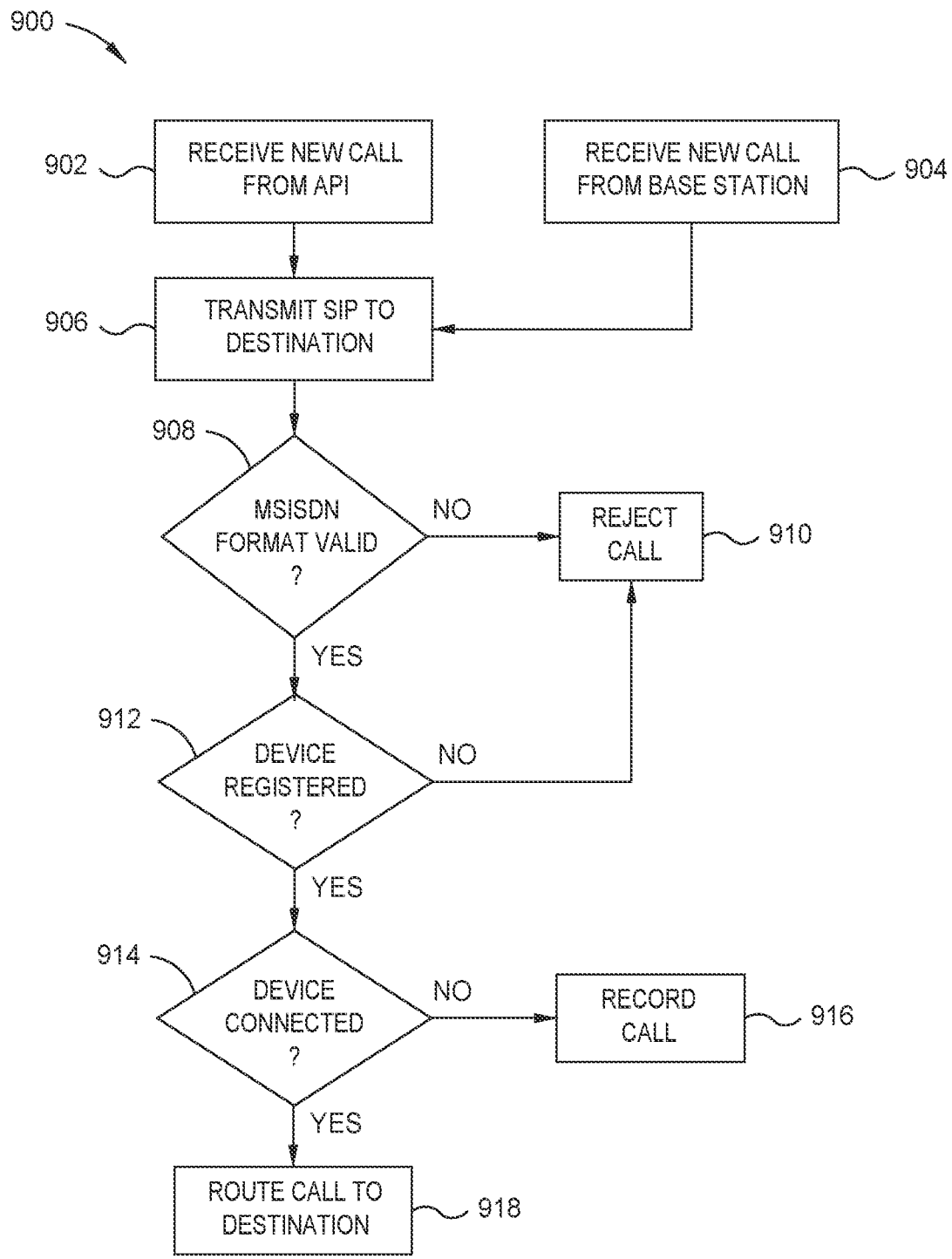
FIG. 9 is a flowchart for forwarding an incoming call into the subscriber management network, according to one embodiment.

FIG. 9 is a flowchart 900 for forwarding an incoming call into the subscriber management network (e.g., the system 100 illustrated in FIG. 1), according to one embodiment. At block 902, a subscriber management service (e.g., the subscriber management service 102A illustrated in FIG. 1 or any other suitable service or combination of services) receives a new call initiated by an external calling API (e.g., outside the subscriber management network). At block 904, as an alternative, the subscriber management service receives a new call from a base station.

At block 906, the subscriber management service receives a session initiation protocol (SIP) message and transmits the message to a destination (e.g., to a destination base station using a VPN host). In an embodiment, the subscriber management service transmits the SIP message to the VPN host, and destination base station, whether the new call is received form an external calling API or from a base station.

At block 908, the subscriber management service determines whether the format of the destination MSISDN is valid. If not, the flow proceeds to block 910. At block 910, the subscriber management service rejects the call.

Returning to block 908, if the MSISDN format is valid the flow proceeds to block 912. At block 912, the subscriber management service determines whether the destination device is registered on the subscriber management network. For example, the subscriber management service can determine whether an MSISDN for the destination device is registered on the network. If not, the flow proceeds to block 910 and the subscriber management service rejects the call.

Returning to block 912, if the subscriber management service determines that the destination device is registered on the subscriber management network (e.g., using the list of registered devices discussed above in relation to block 612 in FIG. 6) the flow proceeds to block 914. At block 914 the subscriber management service determines whether the destination device is currently connected to the subscriber management network (e.g., using the connected list discussed above in relation to block 614 in FIG. 6). If not, the flow proceeds to block 916. At block 916, the subscriber management service records the call. For example, the subscriber management service can activate an automated voice messaging system to record the call. In an embodiment, the list of registered devices, the connected list, or both, can be maintained at a central database (e.g., the database 414 illustrated in FIG. 4).

Returning to block 914, if the subscriber management service determines that the destination device is currently connected to the subscriber management network the flow proceeds to block 918. At block 918, the subscriber management service routes the call to the destination. In an embodiment, the subscriber management service routes the call to a base station to which the destination device is connected.

In an embodiment, the flowchart 900 is discussed in terms of voice calls. This is merely one example. Similar techniques can be applied to SMS messages (e.g., replacing recording the call at block 916 with recording the SMS message) or any other suitable communication between devices.

Figure 10:
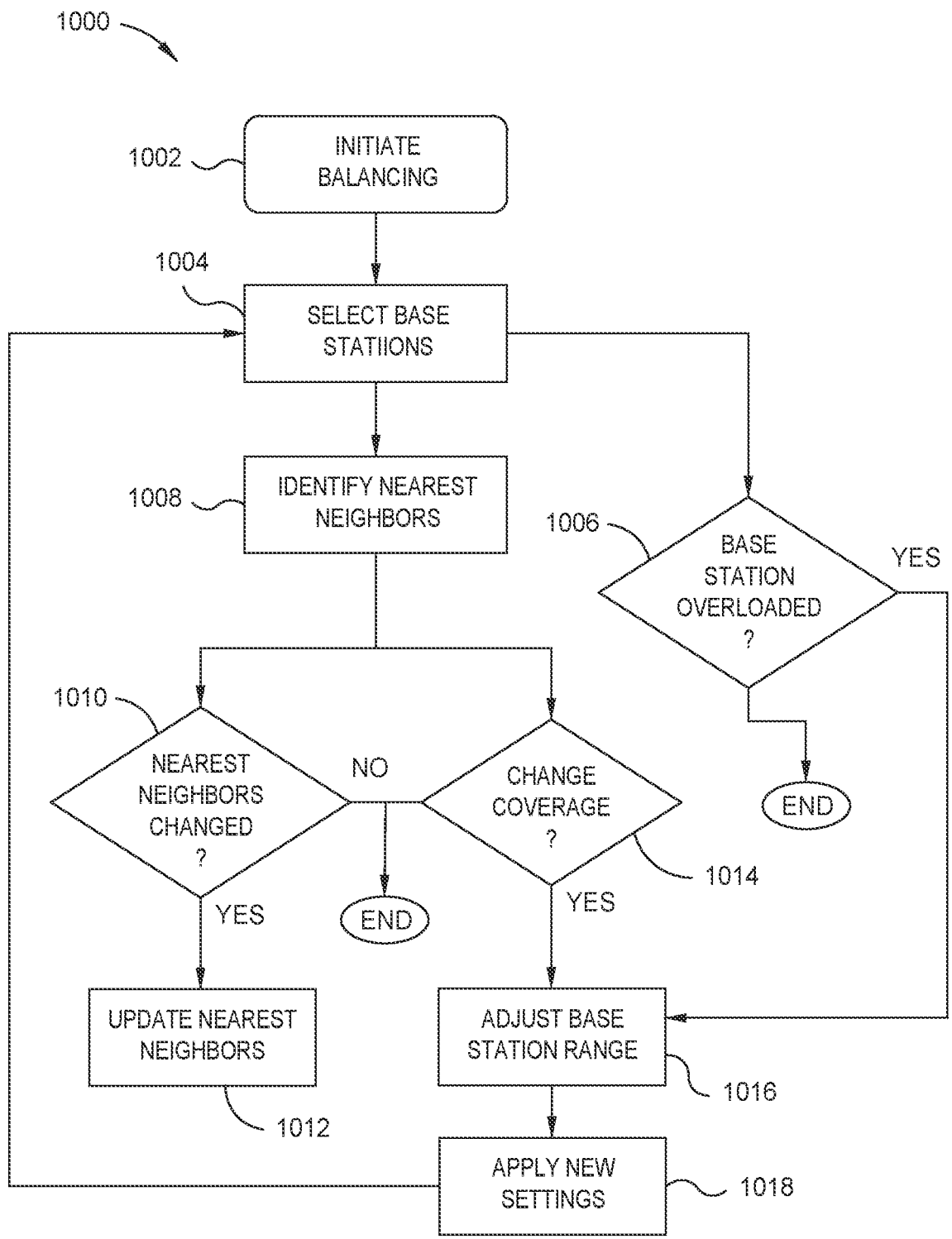
FIG. 10 is a flowchart for balancing a network using data from deployed base stations, according to one embodiment.

FIG. 10 is a flowchart 1000 for balancing a network using data from deployed base stations (e.g., 104 shown in FIG. 1), according to one embodiment. In an embodiment, a subscriber management service (e.g., the subscriber management service 102A illustrated in FIG. 1 or any other suitable service or combination of services) uses data coming in from one or more base stations to balance the network. The data can include GPS position, network usage, CPU usage, or any other suitable data. In an embodiment, balancing the network can reduce dead zones in coverage and network congestion, for example, by increasing or decreasing the range of base stations to assign more or fewer mobile devices per base station. Additionally, the subscriber management service can determine neighboring base stations for base stations that are required for performing call handovers.

At block 1002, the subscriber management service initiates balancing for base stations. In an embodiment, the subscriber management service can periodically balance the base stations. For example, the subscriber management service can return to block 1002 after a predetermined time interval.

At block 1004, the subscriber management service selects base stations for balancing. In an embodiment, the subscriber management service initiates balancing for one base station in the subscriber management network, or a subset of base stations in the subscriber management network. Alternatively, or in addition, the subscriber management service initiates balancing for all base stations in the subscriber management network. The subscriber management service then flows to two blocks: block 1006 and block 1008.

At block 1006, the subscriber management service determines whether a base station is overloaded with traffic. In an embodiment, when CPU usage at a base station exceeds a threshold (e.g., a predetermined threshold), this can indicate that the base station is computationally overloaded. Alternatively, or in addition, the number of active devices associated with the base station (e.g., connected devices) can indicate that the base station is overloaded. For example, if the subscriber management service determines that the number of associated devices exceeds a threshold (e.g., a predetermined threshold), the subscriber management service can determine that the base station is overloaded. This can be referred to as numerical overloading. In an embodiment, the thresholds can initially be default value, and may be set by a user (e.g., a network administrator) using suitable software (e.g., using a suitable user interface).

If the subscriber management service does not detect overloading, that branch of the flow ends. If the subscriber management service detects overloading, the flow proceeds to block 1016. At block 1016, the subscriber management service adjusts the base station range. In an embodiment, the subscriber management service requests that a background worker recalculates a base station configuration setting to adjust the range of the base station. An adjustment may include decreasing the range of the base station such that it is connected to fewer mobile devices. However, the adjustment process can also include increasing the range of other base stations such that they are able to connect to more mobile devices and thereby reduce the traffic on the overloaded base station, or a combination of both. One exemplary process for balancing the network can include the following:

For the overloaded base station, the decrease in range can be determined from a power output reduction that may be implemented in the base station. A "coverage gap," or amount of area not covered by the network in the new configuration, can be determined based on the other base stations in the network and the calculations of their range compared to the decrease in range of the overloaded base station. For the nearest neighbors of the overloaded base station, a new output power can be calculated that reduces the coverage gap. When the coverage gap is below a predetermined threshold, the new settings can be applied across the network. For example, at block 1018 the subscriber management service can apply the new settings to a central database (e.g., the database 414 illustrated in FIG. 4). If the coverage gap is not below the threshold, then the process can be repeated where the overloaded base station can change its power output reduction. In some cases, this can result in no range reduction because the coverage gap would be too large given any power output reduction.

Returning to block 1004, the second branch of the flow proceeds to block 1008. At block 1008 the subscriber management service determines the nearest neighbors for a given base station. For example, the subscriber management service can use GPS data to identify the nearest neighbors. This is merely one example, and any suitable technique can be used. This is discussed further below with regard to FIGS. 11 and 12A-B.

After determining the nearest neighbors, the subscriber management service performs two checks. At block 1010, the subscriber management service determines whether the nearest neighbors of a particular base station have changed relative to the last recorded listing of nearest neighbors in the central database. If so, the flow proceeds to block 1012. At block 1012, the subscriber management service updates a list of nearest neighbors. For example, the subscriber management service can update a central database (e.g., the database 414 illustrated in FIG. 4). If the recorded list of nearest neighbors has not changed, this branch of the flow ends.

Returning to block 1008, the second check relates to identifying coverage gaps and overlaps. At block 1014 the subscriber management service determines whether coverage should change. For example, the subscriber management service can determine whether there are coverage gaps, or overlaps, based on a predicted range of the base station.

In an embodiment a coverage gap (e.g., between two base stations A and B) can be expressed by the following equation:

$$\text{coverage gap} = \text{distance}(A,B) - \text{range}(A) - \text{range}(B).$$

"Range" can be the range of a base station in the direction of the other base station. If the coverage gap is negative then the base stations can be considered to have "overlap" rather than a "gap" or lack of overlap. In some simplified calculations, the range can be based on a circle around a particular base station, however, it is also contemplated that range can be affected to be an irregular shape due to the effects of terrain or other obstacles. In some embodiments, the range can be predicted using a link budget equation. This equation can take into account radiation losses due to propagation through the air, the power transmitted by the base stations, the estimated receiver sensitivity of the mobile devices, and other estimated losses that can be manually input into the control software specific to the deployment area (such as building losses in populated areas or interference on that frequency band in that area). Other embodiments can include the range calculation considering the height of a transmitter off of the ground, terrain models of the surroundings, and may include automatically mapping estimated interference on different bands and building losses based on the GPS location.

If the subscriber management service determines that coverage should be changed (e.g., there are coverage gaps or overlaps), the flow proceeds to block 1016. As described above, at block 1016 the subscriber management service recalculates the base station configuration settings (e.g., to adjust range). After the base station configuration settings are recalculated, at 1018, the subscriber management service applies the new settings. In an embodiment, the subscriber management service updates a central database (e.g., the database 414 illustrated in FIG. 4) with the new configuration settings. In some embodiments, the subscriber management service can then automatically trigger an update of nearby base stations (e.g., the determined "nearest neighbors" described above).

Figure 11:
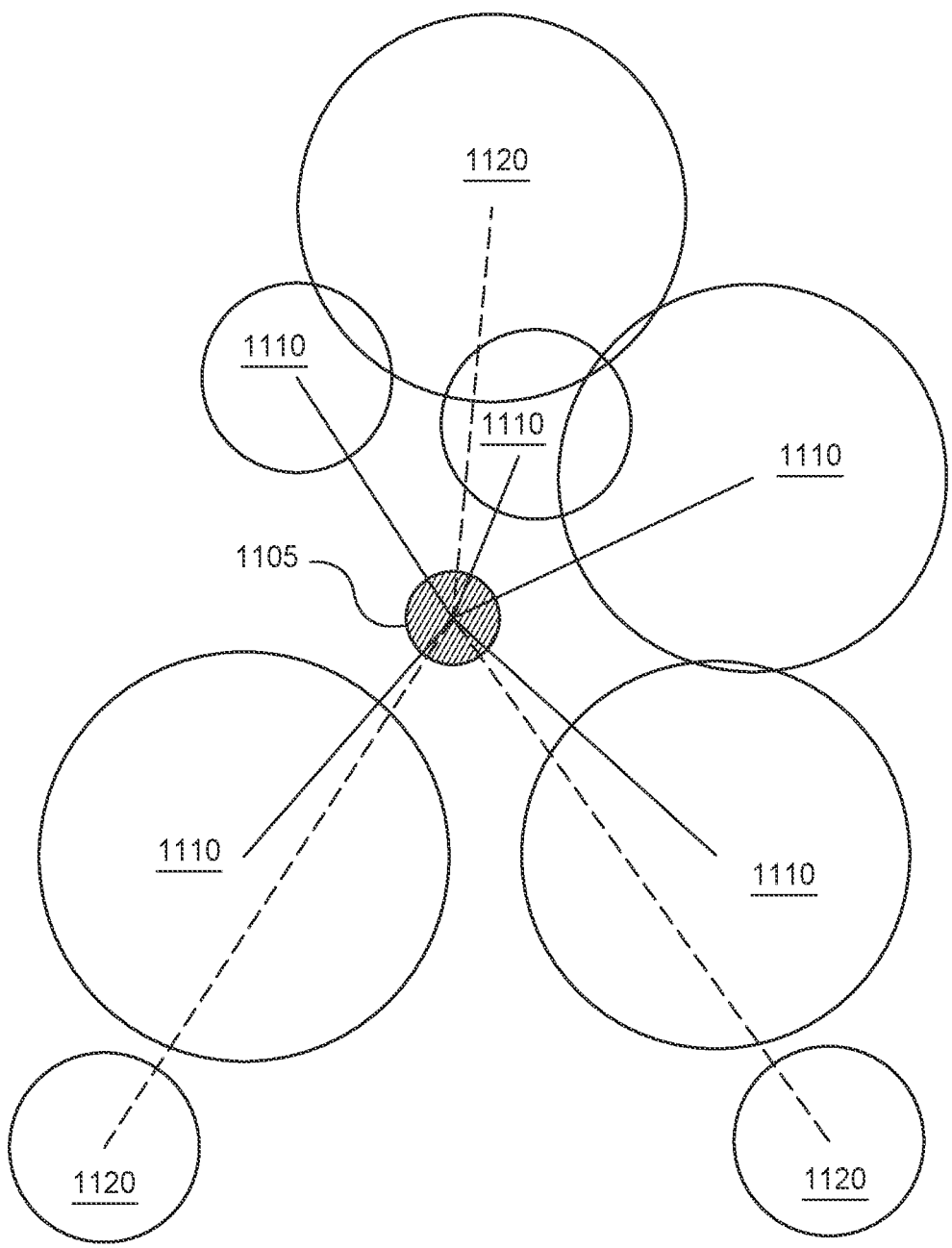
FIG. 11 illustrates determining nearest neighbors to a base station, according to an embodiment.

FIG. 11 illustrates determining nearest neighbors to a base station, according to an embodiment. In an embodiment, whether a base station is considered a "nearest neighbor" can be based on whether there is a line between the centers of the two respective base stations that does not intersect the range of any other base station. For example, as illustrated in FIG. 11, a collection of base stations (1110 and 1120) having variable range (depicted by the radius of the circles) can be at varying locations relative to a central base station 1105. In FIG. 11, lines are drawn from the center of each base station (1110 and 1120) to central base station 1105. As shown, the lines that do not intersect the range of any other base station are shown solid and accordingly these base stations 1110 are considered nearest neighbors. In contrast, base stations 1120 whose lines, shown dashed, which do intersect the range of at least one other base station are not considered nearest neighbors. The positions of the base stations, as used in this determination, can be based on, for example, GPS position, or other means of providing location data for the various base stations (e.g., using signal strength between base stations).

Figure 12A:
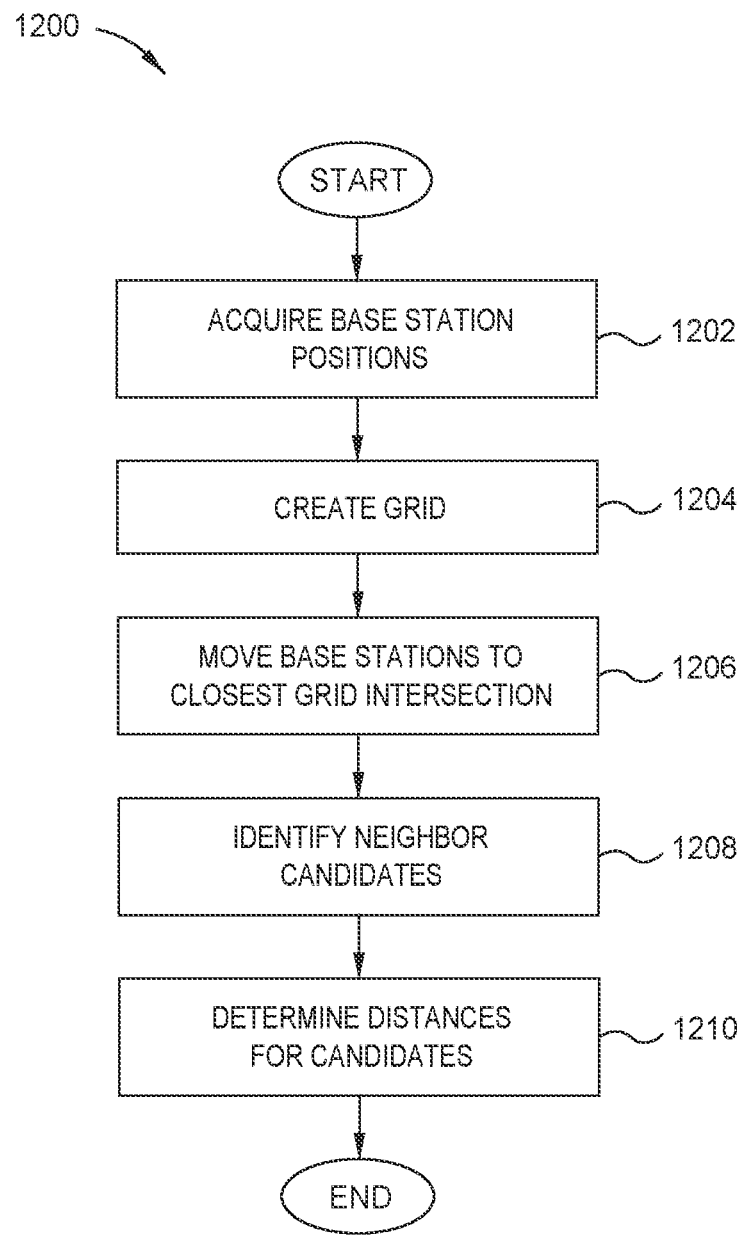
FIG. 12A is a flowchart for determining nearest neighbors to a base station, according to an embodiment.
Figure 12B:
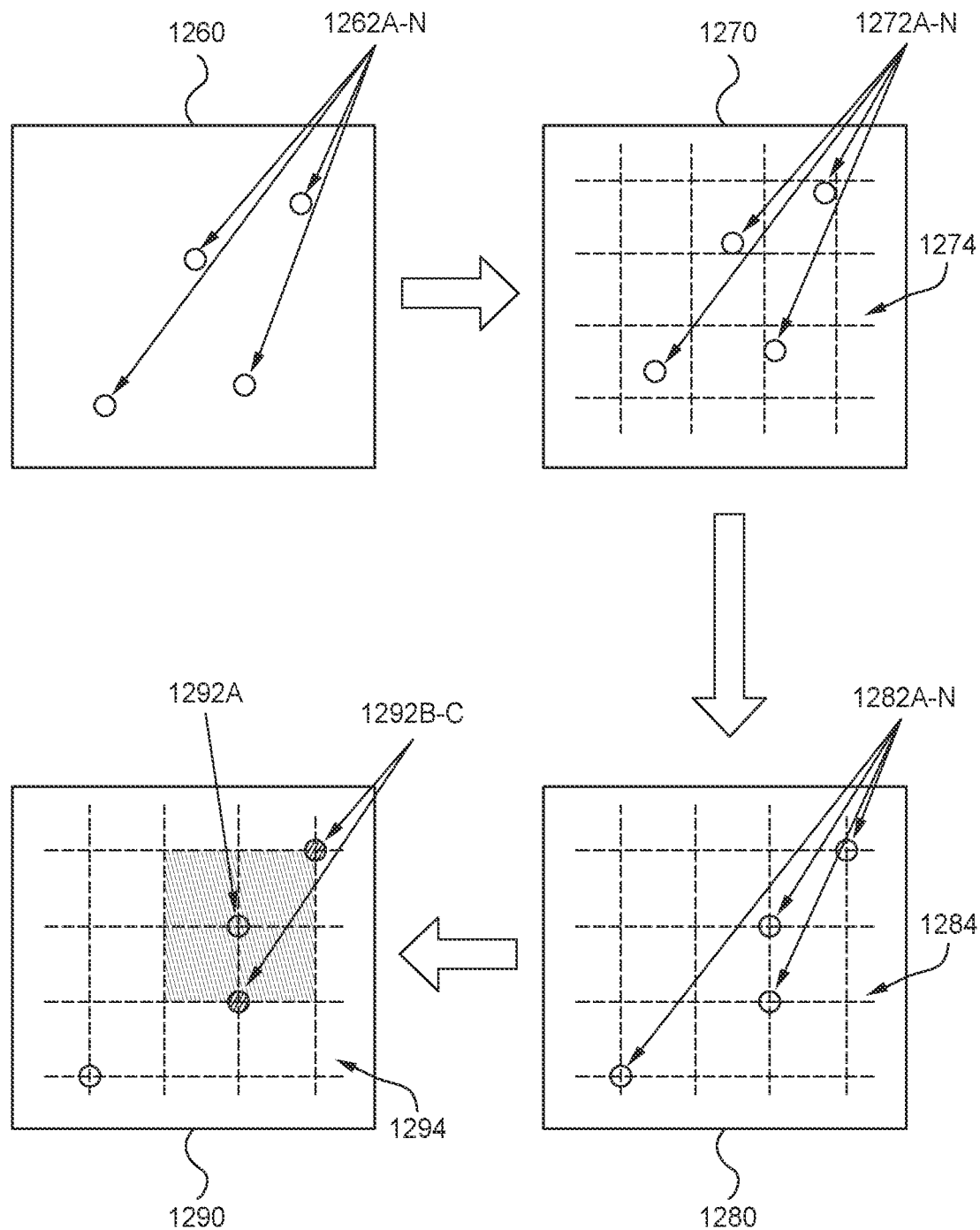
FIG. 12B further illustrates determining nearest neighbors to a base station, according to an embodiment.

FIG. 12A is a flowchart 1200 for determining nearest neighbors to a base station, according to an embodiment. FIG. 12B further illustrates determining nearest neighbors to a base station, according to an embodiment. FIGS. 12A-B are discussed together.

In an embodiment, calculating nearest neighbors for base stations can allow for more efficient handover between base stations. For example, the system 100 illustrated in FIG. 1 can more efficiently coordinate handover between base stations (e.g., transitioning a mobile device from one base station to another base station) when a base station's nearest neighbors are known. Further, in an embodiment, the nearest neighbor techniques illustrated in relation to FIGS. 12A-B (and FIG. 11, above), can be initiated when a base station is added to the subscriber management network or when a major change occurs. For example, the techniques can be initiated when a base station is added, physically moved, goes offline, or loses connection temporarily.

At block 1202 in FIG. 12A, a subscriber management service (e.g., the subscriber management service 102A illustrated in FIG. 1 or any other suitable service or combination of services) acquires base station positions. For example, the subscriber management service can be implemented in a cloud processing node (e.g., in cloud environment 302 illustrated in FIG. 3). This is merely one example, and the subscriber management service can be implemented in any suitable system. In an embodiment, the subscriber management service acquires the positions of all base stations in the subscriber management network. This is illustrated in diagram 1260 in FIG. 12B. The elements 1262A-N represent base station positions.

At block 1204 in FIG. 12A, the subscriber management service creates a grid. In an embodiment, the subscriber management service creates a uniform, rectangular grid. The grid size can be equal to 2*max_range, where max_range is the maximum value of the predicted radio propagation ranges of each base station in the network. This is illustrated in diagram 1270 in FIG. 12B. The elements 1272A-N represent base station positions in a grid 1274.

At block 1206 in FIG. 12A, the subscriber management service moves the base stations to the closest grid intersection. This is illustrated in diagram 1280 in FIG. 12B. The elements 1282A-N represent base station positions in a grid 1284. Each of the elements 1272A-N illustrated in diagram 1270 have been moved to a closest grid intersection.

At block 1208 in FIG. 12A, the subscriber management service identifies neighbor candidates. In an embodiment, the neighbor candidates for a given base station are base stations that are one step away from the base station, on the grid, or that are on the same grid intersection. This is illustrated in diagram 1290 in FIG. 12B. The base station being examined is represented by the element 1292A. The neighbor candidates are represented by the elements 1292B-C. Each of the elements 1292B-C is one step away from the element 1292A, on the grid 1294.

At block 1210 in FIG. 12A, the subscriber management service determines distances for the candidates. In an embodiment, the subscriber management service identifies the nearest neighbor for a given base station based on determining which of the candidate base stations (e.g., identified at block 1208) is nearest to the given base station. For example, the subscriber management service can perform a range calculation between the given base station 1292A illustrated in FIG. 12B, and each of the neighbor candidate base stations 1292B-C.

In an embodiment, the subscriber management service can perform the range calculation by taking the base station coordinates and calculating the Pythagorean distance between them. The subscriber management service can then check if this distance is less than the sum of the predicted propagation ranges of the base station pair. If the Pythagorean distance is less than the sum of the predicted propagation ranges, then these base stations are neighbors. If the distance is not less, then the base stations are not neighbors.

In an embodiment, the nearest neighbor techniques discussed in relation to FIGS. 12A-B have numerous advantages. For example, calculating a distance between every possible pairing of base stations (e.g., between each base station and every other base station) is extremely computationally expensive, especially for a system including a large number of base stations. Identifying nearest neighbor candidates for a given base station, as discussed above, is much less computationally expensive while maintaining accuracy (e.g., sufficient accuracy to facilitate handoff between base stations).

Figure 13:
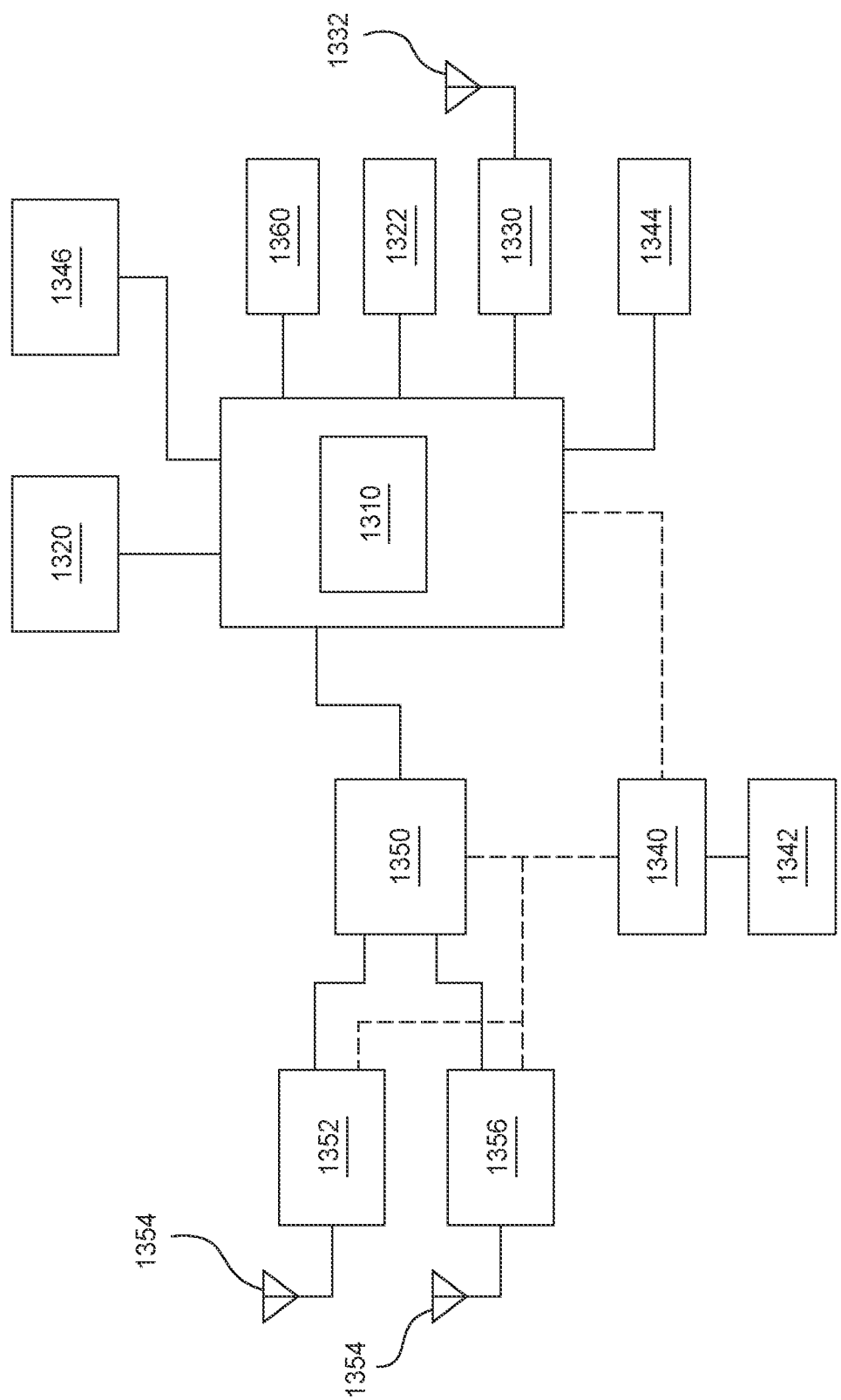
FIG. 13 is a block diagram illustrating base station hardware, according to one embodiment.

FIG. 13 is a block diagram illustrating base station hardware (e.g., a base station 104 shown in FIG. 1), according to one embodiment. The base station can include, for example, a computer 1310, which may be a single-board computer including a number of data processors and associated hardware for the control and operation of the base station. Internet connectivity can be provided via one or more Ethernet ports 1320 and/or one or more USB Wi-Fi adapters 1322. In some embodiments, the computer 1310 can also be connected to a GPS module 1330 that receives GPS data via receiver antenna 1332. Power can be provided via an AC to DC power supply 1340 coupled to an AC input connector 1342. Also, there can be a Real Time Clock (RTC) coin cell 1344 to provide power to maintain system time in the absence of external power. One or more components of the base station can be toggled via a power switch 1346. The base station can also include a software-defined radio 1350 in communication with the computer 1310 as well as a power amplifier 1352 that transmits signals (e.g. cellular data) via antenna(s) 1354. In some embodiments, there can be a low noise amplifier 1356 which amplifies received signals via antenna(s) 1354 and transmits the amplified signal to software-defined radio 1350. There may also be a display module 1360 (e.g., a screen for a visual display) that may be used to display data regarding status of the base station.

In the current disclosure, reference is made to various embodiments. However, the scope of the present disclosure is not limited to specific described embodiments. Instead, any combination of the described features and elements, whether related to different embodiments or not, is contemplated to implement and practice contemplated embodiments. Additionally, when elements of the embodiments are described in the form of "at least one of A and B," it will be understood that embodiments including element A exclusively, including element B exclusively, and including element A and B are each contemplated. Furthermore, although some embodiments disclosed herein may achieve advantages over other possible solutions or over the prior art, whether or not a particular advantage is achieved by a given embodiment is not limiting of the scope of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, the embodiments disclosed herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations and/or block diagrams of methods, apparatuses (systems), and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations and/or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations and/or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations and/or block diagrams.

The flowchart illustrations and block diagrams in the Figures illustrate the architecture, functionality, and operation of possible implementations of systems, methods, and computer program products according to various embodiments. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

In view of the foregoing, the scope of the present disclosure is determined by the claims that follow.

We claim:

1. A system, comprising:
a first base station;
a second base station;
one or more processors; and
a memory storing a program, which, when executed on the one or more processors, performs an operation, the operation comprising:
establishing a first virtual private network (VPN) connection between the first base station and a VPN host;
establishing a second VPN connection between the second base station and the VPN host;
receiving a request for cellular service at the first base station from a first mobile device;
determining, based on a communication from the first base station to a database using the first VPN connection, that the first mobile device does not have a recognized associated identifier, and in response assigning an identifier for the first mobile device, wherein the identifier comprises a mobile station international subscriber directory number (MSISDN);
routing a second cellular communication from the first base station to the first mobile device using the identifier;
receiving a cellular communication at the first base station from the first mobile device, the cellular communication destined for a second mobile device;
determining that the second mobile device is associated with the second base station using the second VPN connection;
managing cellular network communication for the first base station and the second base station using one or more of the first and second VPN connections; and
routing the cellular communication to at least one of: (i) the second base station using the VPN connection or (ii) an external communication network via a network gateway.

2. The system of claim 1, wherein the first base station and the second base station are part of a cellular network, and wherein the determining that the first mobile device does not have a recognized associated identifier comprises determining that the first mobile device does not have an assigned MSISDN in the cellular network.

3. The system of claim 1, the operation further comprising:
determining that the first base station is overloaded, and response modifying at least one of: (i) a coverage range of the first base station or (ii) a coverage range of the second base station.

4. The system of claim 1, wherein the first base station is part of a cellular network comprising a plurality of base stations, the operation further comprising:
determining a nearest neighbor base station, for the first base station, from among the plurality of base stations, comprising:
determining a plurality of candidate neighbor base stations, from among the plurality of base stations, using a grid; and
identifying a distance between the first base station and each of the plurality of candidate base stations.

5. The system of claim 1, wherein the one or more processors are located in the first base station, the second base station, or both base stations.

6. The system of claim 1, wherein
establishing the first VPN connection between the first base station and the VPN host is managed using a first controller, and
establishing the second VPN connection between the second base station and the VPN host is managed using the first controller.

7. A method, comprising:
establishing a first virtual private network (VPN) connection between a first base station and a VPN host;
establishing a second VPN connection between a second base station and the VPN host;
receiving a request for cellular service at the first base station from a first mobile device;
determining, based on a communication from the first base station to a database using the first VPN connection, that the first mobile device does not have a recognized associated identifier, and in response assigning an identifier for the first mobile device, wherein the identifier comprises a mobile station international subscriber directory number (MSISDN);
routing a second cellular communication from the first base station to the first mobile device using the identifier;
receiving a cellular communication at the first base station from the first mobile device, the cellular communication destined for a second mobile device;
determining that the second mobile device is associated with the second base station using the second VPN connection;
managing cellular network communication for the first base station and the second base station using one or more of the first and second VPN connections; and
routing the cellular communication to at least one of: (i) the second base station using the VPN connection or (ii) an external communication network via a network gateway.

8. The method of claim 7, wherein the first base station and the second base station are part of a cellular network, and wherein the determining that the first mobile device does not have a recognized associated identifier comprises determining that the first mobile device does not have an assigned MSISDN in the cellular network.

9. The method of claim 7, further comprising:
determining that the first base station is overloaded, and response modifying at least one of: (i) a coverage range of the first base station or (ii) a coverage range of the second base station.

10. The method of claim 7, wherein the first base station is part of a cellular network comprising a plurality of base stations, the method further comprising:
determining a nearest neighbor base station, for the first base station, from among the plurality of base stations, comprising:
determining a plurality of candidate neighbor base stations, from among the plurality of base stations, using a grid; and
identifying a distance between the first base station and each of the plurality of candidate base stations.

11. The method of claim 7, wherein establishing the first VPN connection between the first base station and the VPN host is managed using a first controller, and establishing the second VPN connection between the second base station and the VPN host is managed using the first controller.

12. A non-transitory computer-readable storage medium having computer- readable program code embodied therewith, the computer-readable program code executable by any combination of one or more computer processors to perform an operation, the operation comprising:
    establishing a first virtual private network (VPN) connection between a first base station and a VPN host;
    establishing a second VPN connection between a second base station and the VPN host;
    receiving a request for cellular service at the first base station from a first mobile device;
    determining, based on a communication from the first base station to a database using the first VPN connection, that the first mobile device does not have a recognized associated identifier, and in response assigning an identifier for the first mobile device, wherein the identifier comprises a mobile station international subscriber directory number (MSISDN);
    routing a second cellular communication from the first base station to the first mobile device using the identifier;
    receiving a cellular communication at the first base station from the first mobile device, the cellular communication destined for a second mobile device;
    determining that the second mobile device is associated with the second base station using the second VPN connection;
    managing cellular network communication for the first base station and the second base station using one or more of the first and second VPN connections; and
    routing the cellular communication to at least one of: (i) the second base station using the VPN connection or (ii) an external communication network via a network gateway.

13. The non-transitory computer-readable storage medium of claim 12, wherein the first base station and the second base station are part of a cellular network, and wherein the determining that the first mobile device does not have a recognized associated identifier comprises determining that the first mobile device does not have an assigned MSISDN in the cellular network.

14. The non-transitory computer-readable storage medium of claim 12, the operation further comprising:
    determining that the first base station is overloaded, and response modifying at least one of: (i) a coverage range of the first base station or (ii) a coverage range of the second base station.

15. The non-transitory computer-readable storage medium of claim 12, wherein the first base station is part of a cellular network comprising a plurality of base stations, the operation further comprising:
    determining a nearest neighbor base station, for the first base station, from among the plurality of base stations, comprising:
        determining a plurality of candidate neighbor base stations, from among the plurality of base stations, using a grid; and
        identifying a distance between the first base station and each of the plurality of candidate base stations.

16. The non-transitory computer-readable storage medium of claim 12, wherein the one or more processors are located in the first base station, the second base station, or both base stations.

17. The non-transitory computer-readable storage medium of claim 12, wherein
    establishing the first VPN connection between the first base station and the VPN host is managed using a first controller, and
    establishing the second VPN connection between the second base station and the VPN host is managed using the first controller.

* * * * *